(12) United States Patent
Sinha et al.

(10) Patent No.: US 11,538,437 B2
(45) Date of Patent: Dec. 27, 2022

(54) LOW POWER REFRESH DURING SEMI-ACTIVE WORKLOADS

(71) Applicant: Intel Corporation, Santa Clara, CA (US)

(72) Inventors: Vishal R. Sinha, Portland, OR (US); Paul S. Diefenbaugh, Portland, OR (US); Douglas Robert Huard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/914,325

(22) Filed: Jun. 27, 2020

(65) Prior Publication Data

US 2020/0327862 A1 Oct. 15, 2020

(51) Int. Cl.
*G09G 5/00* (2006.01)
*G06F 3/14* (2006.01)

(52) U.S. Cl.
CPC ......... *G09G 5/003* (2013.01); *G06F 3/1407* (2013.01); *G06F 3/1431* (2013.01); *G09G 2300/02* (2013.01); *G09G 2330/023* (2013.01); *G09G 2340/0407* (2013.01); *G09G 2360/04* (2013.01)

(58) Field of Classification Search
CPC ..... G06F 3/1431; G06F 3/1407; G09G 5/003; G09G 2360/04; G09G 2340/0435; G09G 2340/0407; G09G 2330/021; G09G 2330/023; G09G 2300/02
See application file for complete search history.

(56) References Cited

U.S. PATENT DOCUMENTS

| | | | | |
|---|---|---|---|---|
| 2016/0078838 A1* | 3/2016 | Huang | ..................... | G09G 5/00 345/520 |
| 2016/0314734 A1* | 10/2016 | Albrecht | .............. | G09G 3/2066 |
| 2017/0092196 A1* | 3/2017 | Gupta | .................. | G09G 3/3266 |
| 2018/0286345 A1* | 10/2018 | Lee | ......................... | G09G 5/006 |
| 2021/0233495 A1* | 7/2021 | Morris | .................. | G06F 3/1446 |

* cited by examiner

*Primary Examiner* — Abbas I Abdulselam
(74) *Attorney, Agent, or Firm* — Patent Capital Group

(57) ABSTRACT

Particular embodiments described herein provide for an electronic device that includes a display and is configured enabling a low power refresh during a semi-active workload. The electronic device includes a display engine, where the display engine generates a video stream with a frame rate, a display, where the display includes an image viewable by a user and the image is refreshed at a first refresh rate, and a timing controller located in the display, where the timing control receives an indicator from the display engine and uses the indicator to determine that the first refresh rate can be lowered to a second refresh rate without the frame rate of the video stream from the display engine being changed. In an example, the indicator is frame with no image data at the start of the frame. In another example, the indicator is an implicit indictor sent by the display engine.

20 Claims, 5 Drawing Sheets

LOW POWER REFRESH DURING SEMI-ACTIVE WORKLOADS

TECHNICAL FIELD

This disclosure relates in general to the field of computing, and more particularly, to a system for enabling a low power refresh during a semi-active workload.

BACKGROUND

End users have more electronic device choices than ever before. A number of prominent technological trends are currently afoot and these trends are changing the electronic device landscape. Some of the technological trends involve a device that includes a display.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1:
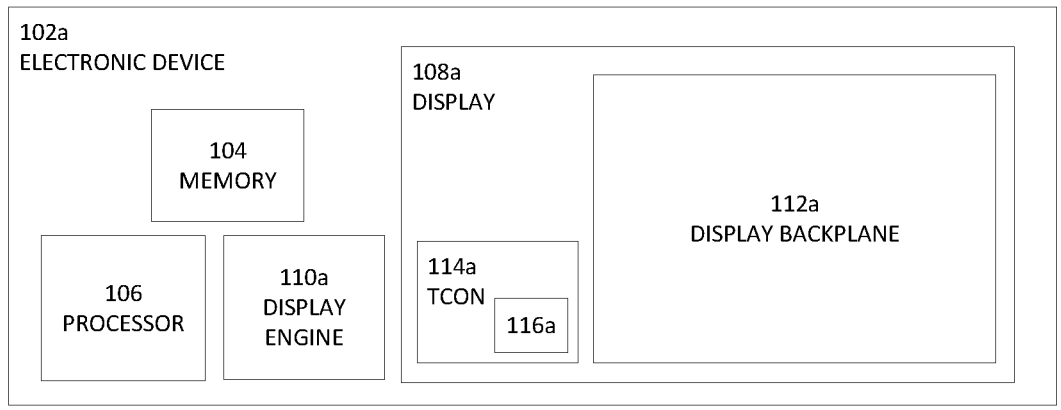
FIG. 1 is a simplified block diagram of a system to enable a low power refresh during a semi-active workload, in accordance with an embodiment of the present disclosure.
Figure 1:
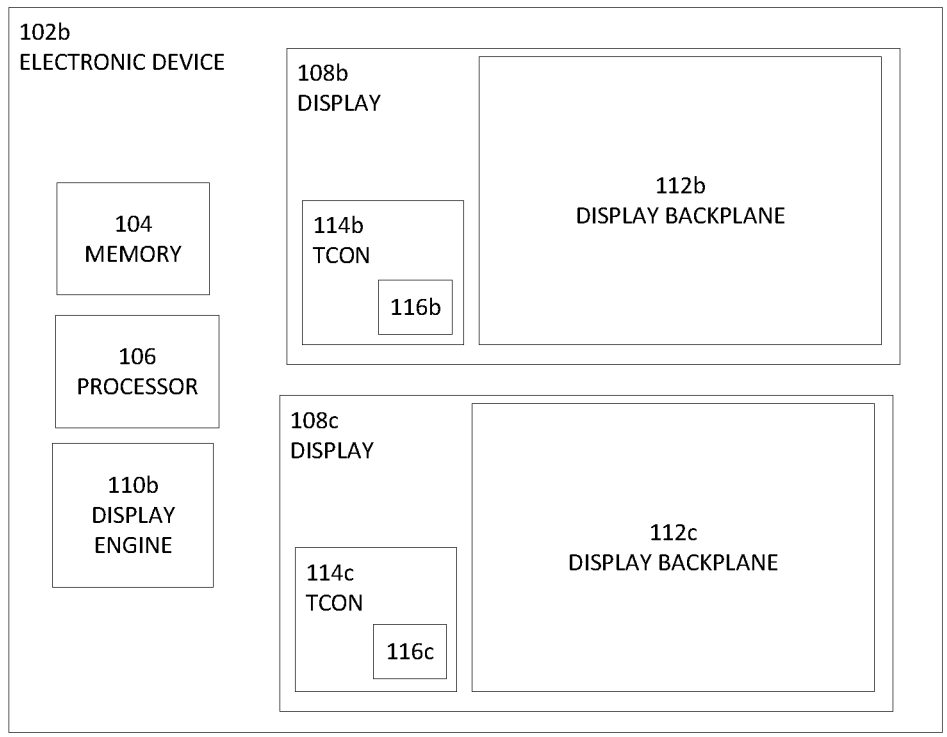

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling a low power refresh during a semi-active workload in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one layer or component with respect to other layers or components. For example, one layer or component disposed over or under another layer or component may be directly in contact with the other layer or component or may have one or more intervening layers or components. Moreover, one layer or component disposed between two layers or components may be directly in contact with the two layers or components or may have one or more intervening layers or components. In contrast, a first layer or first component "directly on" a second layer or second component is in direct contact with that second layer or second component. Similarly, unless explicitly stated otherwise, one feature disposed between two features may be in direct contact with the adjacent features or may have one or more intervening layers.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus fifteen percent (±15%) variation.

FIG. 1 is a simplified block diagram of electronic devices configured to enable a low power refresh during a semi-active workload, in accordance with an embodiment of the present disclosure. In an example, an electronic device 102a can include memory 104, one or more processors 106, a display 108a, and a display engine 110a. Display 108a can include a display backplane 112a, and a timing controller (TCON) 114a. In some examples, TCON 114a can include a remote frame buffer 116a. An electronic device 102b can include memory 104, one or more processors 106, a display engine 110b, and a plurality of displays. For example, as illustrated in FIG. 1, electronic device 102b includes display 108b and 108c. In an example, display 108b may have a first dedicated display engine or core of a display engine and display 108c may have a separate second dedicated display engine or core of a display engine. Display 108b can include a display backplane 112b, and a TCON 114b. In some examples, TCON 114b can include a remote frame buffer 116b. Display 108c can include a display backplane 112c, and a TCON 114c. In some examples, TCON 114c can include a remote frame buffer 116c. Display backplane 112a-112c can be an array of display pixels.

Each of displays 108a-108c can support at least two refresh rates, a default refresh rate and a low refresh rate. Display engine 110a can be located on a system on chip (SoC) and configured to help display an image on display 108a. In addition, display engine 110b can be located on an SoC and configured to help display an image on display 108b and on display 108c. Each of TCONs 114a-114c are a timing controller on the display side.

Display engine 110a is responsible for transforming mathematical equations into individual pixels and frames and communicating the individual pixel and frames to TCON 114a as a video stream with a frame rate. TCON 114a receives the individual frames generated by display engine 110a, corrects for color and brightness, controls the refresh rate, controls power savings of display 108a, touch (if enabled), etc. TCON 114a can be configured to provide a low latency method to lower the display refresh rate for semi-active workloads like browsing and productivity. Reducing the display refresh rate lowers the display power and increases the battery life for electronic device 102a.

Display engine 110b is responsible for transforming mathematical equations into individual pixels and frames and communicating the individual pixel and frames to TCON 114b and TCON 114c as a video stream with a frame rate. TCON 114b receives the individual frames generated by display engine 110b, corrects for color and brightness, controls the refresh rate, controls power savings of display 108b, touch (if enabled), etc. TCON 114c receives the individual frames generated by display engine 110b, corrects for color and brightness, controls the refresh rate, controls power savings of display 108c, touch (if enabled), etc. TCON 114b and TCON 114c can each be configured to provide a low latency method to lower the display refresh rate for semi-active workloads like browsing and productivity. Reducing the display refresh rate lowers the display power and increases the battery life for electronic device 102b.

In some systems, the display engine has a frame rate (i.e., generates a video stream with a frame rate) of sixty (60) hertz (Hz) and refreshes the display every 60th of second because the pixels will decay away if not refreshed. An image that appears to be static on the display is not really a static image. Even though the image is not changing when viewed by a user, the image is being rewritten and redisplayed sixty (60) times a second for a sixty (60) Hz display. TCON 114a can be configured to determine there is no new image data or changed image data from display engine 110a and TCON 114a will lower the refresh rate so the number of times a second that TCON 114a redraws the image on display 108a is reduced. This allows TCON 114a to lower a first refresh rate to a second refresh rate without requiring the frame rate of the video stream from display engine 110a to be lowered. In addition, TCON 114b can be configured to determine there is no new image data or changed image data from display engine 110b and TCON 114b will lower the refresh rate so the number of times a second that TCON 114b redraws the image on display 108b is reduced. This allows TCON 114b to lower a first refresh rate to a second refresh rate without requiring the frame rate of the video stream from display engine 110b to be lowered. Also, TCON 114c can be configured to determine there is no new image data or changed image data from display engine 110b and TCON 114c will lower the refresh rate so the number of times a second that TCON 114c redraws the image on display 108c is reduced. This allows TCON 114c to lower a first refresh rate to a second refresh rate without requiring the frame rate of the video stream from display engine 110b to be lowered.

The following examples are described with respect to display 108a, display engine 110a, and TCON 114a, however, the following examples can also be applicable to displays 108b and 108c, display engine 110b, and TCONS 114b and 114c. While display 108a may be being refreshed at sixty (60) Hz, the image on display 108a may be such that it only needs to be refreshed at twenty (20) Hz. More specifically, in some current systems, the TCON must wait for the display engine to enter deep sleep before the TCON can lower the display refresh rate. This usually takes couple of frame times, resulting in losing the opportunity to lower the refresh rate. In an example, TCON 114a can be configured to automatically lower or slow down the refresh rate from sixty (60) Hz to twenty (20) Hz (or some other refresh rates) and only refresh display 108a twenty (20) times a second without having display engine 110a lower the frame rate of the video stream. This saves power and allows for a low latency method to lower the display refresh rate for semi-active workloads like browsing and productivity. Reducing the display refresh rate lowers the display power and increases the battery life. Semi-active workloads are workloads where an image does not need to be refreshed every $60^{th}$ of a second (for a sixty (60 Hz display) but display engine 110a is still generating frames at a frame rate of sixty (60) Hz because the image is changing and display engine 110a cannot lower the frame rate of the video stream or refresh rate and enter into a power saving mode. The power saving mode can be a lower power mode or some other mode or configuration that uses less power (e.g., PSR2 low power mode or Short Loop). For example, if a video is being displayed on display 108a and display 108a runs at sixty (60) Hz, there is a new frame of data every $60^{th}$ of a second. However, if a user is typing, the user cannot type every 60th of a second and display 108a does not need to be updated every $60^{th}$ of a second but the display engine 110a is not going to drop the frame rate of the video stream or refresh rate so the typing is a semi-active workload. Other examples of a semi-active workload include web browsing, video playback, conferencing, presentations, some gaming applications, or other usages where the display updates are less than sixty (60) Hertz or the refresh rate of display 108a.

In an illustrative example, display engine 110a sends an indication to TCON 114a to notify TCON 114a of frame updates. The indication may be an explicit indication or an implicit indication. TCON 114a uses this indication to identify frame times that have no updates from display engine 110a and allow TCON 114a to skip the self-refresh to display backplane 112a. In this approach, TCON 114a can autonomously reduce the display refresh rate by skipping the self-refresh without losing the synchronization with display engine 110a. This can effectively reduce the display refresh rate and lower the display power. For dual display systems, like electronic device 102b, the indication is sent to the TCON's of both the displays to independently lower the refresh rate of one or both of the displays and allow for system power savings and/or battery life gains. Displays 108a-108c must be able to support two refresh rates, a default refresh rate (e.g. sixty (60) Hz) and low refresh rate (e.g. twenty (20) Hz). It should be noted that the default refresh rate can be a refresh rate other than sixty (60) Hz and the lower refresh rate can be a refresh rate other than twenty (20) Hz, as long as the lower refresh rate is lower than the default refresh rate to allow for power savings and/or battery life gains.

In some examples, the lower refresh rate is a subharmonic of the default refresh rate. Each of displays 108a-108c may have the same default refresh rate or a different default refresh rate and each of displays 108a-108c may have the same low refresh rate or a different low refresh rate. More specifically, displays 108a and 108b may have the same default refresh rate and display 108c may have a different default refresh rate than displays 108a and 108b. Also, displays 108a-108c may have the same default refresh rate but displays 108a-108c may each have a different low refresh rate. In addition, displays 108a-108c may have the same default refresh rate, displays 108a and 108c may have the same low refresh rate, and display 108b may have a different low refresh rate than displays 108a and 108c.

The notification that display engine 110a sends to TCON 114a to notify TCON 114a of frame updates can be an explicit indication or an implicit indication and the TCON 114a can be aware of when a new frame or new image data is being communicated to TCON 114a from display engine 110a. An explicit indication is an explicit signal from display engine 110a that communicates to TCON 114a that no further image data for a frame will be sent to TCON 114a. For an implicit indication, if there is not any image data at the start of a frame sequence, TCON 114a can determine that it will not receive any further image data for the frame. Currently, frame updates are sent at the front of the frame time or, in PSR2 low power mode (Short Loop), the updates are sent at the timing of the dirty scanline (e.g., the updated scanlines in the frame or portion of the frames with update) and not the start of the frame.

It is to be understood that other embodiments may be utilized and structural changes may be made without departing from the scope of the present disclosure. Substantial flexibility is provided by an electronic device in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

For purposes of illustrating certain example techniques of electronic devices 102a and 102b, the following foundational information may be viewed as a basis from which the present disclosure may be properly explained. Generally, a display (e.g., display panel, computer display, computer monitor, monitor, etc.) is an output device that displays information in pictorial form as a frame. A frame is a single still image created by the display engine for display on a display. The frame rate is the number or amount of these images that are displayed in one second. For a video, display engine will create a frame that is then combined in a rapid slideshow with other frames, each one slightly different, to achieve the illusion of natural motion. To produce, or render, a new frame, the display engine determines the physics, positions, and textures of the objects in the scene to produce an image.

While a frame is displayed on the display, the frame is refreshed at a refresh rate. The refresh rate is the frequency that the image on the display is refreshed. The image on the display is typically refreshed sixty (60) times a second where every 60th of a second, a display engine (e.g., a processor, dedicated graphics processor, graphics engine, source, etc.) will generate a new image to display and send it to the display. Most displays have a TCON. The TCON will receive image data from the display engine and the TCON is responsible for turning off and on the pixels that will generate the image. If there is no new image data received from the display engine, the display will still refresh at sixty (60) Hz per second because the pixels in the display will decay away if not refreshed. A static image on a display is not really a static image, even though the image is not changing because it is being rewritten or redisplayed sixty (60) times a second for a display with a sixty (60) Hz refresh rate.

More specifically, a display engine (e.g., computer processing unit (CPU), graphics processing unit (GPU) video processor, etc.) communicates with a TCON and the TCON is configured to drive the display. Most video processors communicate with the TCON using the embedded DisplayPort (eDP) specification. The eDP specification was developed to be used specifically in embedded display applications such as laptops, notebook computers, desktops, all-in-one personal computers, etc. The display engine needs to keep sending video signals to the TCON at a constant rate. This rate, known as frame rate, is typically at least sixty (60) Hz, meaning that the display engine has to send the video signal in a video stream to the TCON at least sixty (60) times per second, even when there is no change in the image because most display panels are such that the pixels will decay away if not refreshed. This can consume a relatively large amount of power so panel self refresh (PSR) was developed to save power for full-screen images. The idea behind PSR is to shut down the display engine and associated circuitry when the image to be displayed on a display is static. More specifically, most current TCONs include a frame buffer and the frame buffer in the TCON can maintain a display image without receiving video image data from the display engine. For a static image, this allows the display engine to enter a low-power state. Allowing the display engine to power down between display updates can save some power and extend the battery life.

Panel self-refresh with selective update (PSR2) is a superset of the panel self-refresh feature and it allows the transmission of modified areas within a video frame and a low latency self-refresh state. PSR2 identifies when only a portion of the screen is static, which is a selective update. The PSR2 is a feature that TCON vendors can choose to include in their timing controller chips. It is a specification and part of the eDP specification. PSR2 requires the display to have a frame buffer and if the display has a frame buffer, then the display can do a self-refresh using the frame buffer when PSR2 mode is enabled.

Selective Updates (SU) during the PSR2 short loop, as per the eDP 1.4b specification, are scanned out by the display engine with only one (1) to two (2) scanlines of advanced notice. This means the TCON has to be prepared to receive new scanlines or image data from the display engine with very little warning. As a result, the TCON will not know if there are any updates to the frame until the frame is finished being sent to the TCON from the display engine, limiting the power savings techniques the TCON can apply, including the inability to lower the refresh rate. The current solutions focus on enabling the display engine to go into the low power state, not the TCON. The selective update only updates a part of the screen or image. Incremental updates can be sent to the display buffer but the TCON does not ever go into a low or lower power mode because the TCON does not know when the next update is coming so it must stay on and be ready to receive data from the display engine.

Currently, there are already several features to lower the display refresh rate (e.g., dynamic refresh rate switch (DRRS), seamless DRRS (sDRRS), dynamic media refresh rate switch (DMRRS), lower refresh rate (LRR and LRR2)), but they are all display engine driven and have latency overhead on entry and exit making it feasible only for latency-insensitivity usages like pervasive idle and for fixed refresh rate scenarios such as full screen video playback (e.g., forty-eight (48) Hz or twenty-four (24) Hz). Changing the refresh rate takes at least several hundred milliseconds, making these features non-usable for semi-active workloads like browsing and productivity which operate at around twenty (20) to thirty (30) frames per second.

Lowering the refresh rate helps lower the display power, which in turn lowers the system power and increases battery life. The refresh rate is the number of times in a second that a display hardware updates its buffer. This is distinct from the measure of frame rate. The refresh rate includes the repeated drawing of identical frames, while frame rate measures how often a display engine can feed an entire frame of new data to the display in a video stream. The refresh rate is the number of times the display updates with new images each second. For example, a sixty (60) Hz refresh rate means the display updates sixty (60) times per second.

In case of dual display systems, it's even more important to lower the refresh rate because there are twice the power savings opportunities. Power savings can be achieved when both the displays can run in a low refresh rate mode independent of each other. For example, if a first display has a refresh rate at sixty (60) Hz and a second display is idle, then for power saving the first display should run at the sixty (60) Hz refresh rate and the second display should run at a lower refresh rate (e.g. 20 Hz). However, in current systems, both displays would run at the sixty (60) Hz refresh rate.

In addition, some current systems can be configured to lower the refresh rate and lower the display power (in some cases lower the display engine power as well) for desktop idle, but none of them can be configured with low latency for a semi-active workload. These current systems lack a low latency solution to lower the display refresh rate and they are not feasible for semi-active workloads. Some systems have a frame skip feature from the TCON that lowers the display refresh rate when in PSR2 deep sleep without the display engine control. This feature offers display power savings for usages like desktop idle. But again, even this method does not have a solution for a semi-active workload and does not support a lower refresh rate for semi-active workloads because they lower the refresh rate only after a latency of one or more frames and after determining that there is no frame change from display engine. What is needed is a system and method that can help to reduce the power consumption of the display during semi-active workloads.

A system and method to help enable a low power refresh during a semi-active workload can resolve these issues (and others). In an example, an electronic device (e.g., electronic device 102) can include a TCON that is configured to use an autonomous low refresh rate mode to lower the display power for the semi-active workloads. The term semi-active workloads includes browsing and productivity where most of an image is static and, in an example of a display with a refresh rate at sixty (60) Hz, where an image does not need to be refreshed every 60th of a second but the display engine is still generating frames at a frame rate of sixty (60) Hz because the image is changing and the display engine cannot lower the refresh rate. Lowering the display power will result in less power usage and a longer battery life for the electronic device. In the autonomous low refresh rate mode, the display engine is designed to send an indication to the TCON to provide notification on frame activity. The TCON uses this indication to identify opportunities where the self-refresh to the display backend (the driver logic and display backplane) can be skipped, such that effective display refresh rate is reduced and the display power is lowered.

The autonomous low refresh rate mode requires the display panel to support at least two refresh rates, a default refresh rate and a low refresh rate using the same pixel clock and different vertical blanking. Additionally, the default refresh rate must an integer multiple of the low refresh rate. More specifically, the default refresh rate should be equal to "n" times the low refresh rate, where "n" is equal to an integer (e.g., n=2, 3, 4 . . . ). In a specific illustrative example, the default refresh rate may be sixty (60) Hz, "n" can be equal to three (3) and the low refresh rate can be twenty (20) Hz.

Within the frame time there is an active frame time and a vertical blanking interval. The amount of active lines determines the active frame time and the amount of vertical blanking lines determines the vertical blanking interval. The active frame lines are the scan lines of a video signal that contain picture information. Most, if not all of the active frame lines are visible on a display. The vertical blanking interval, also known as the vertical interval or VBLANK, is the time between the end of the final visible line of a frame and the beginning of the first visible line of the next frame. The vertical blanking interval is present in analog television, VGA, DVI, and other signals.

The vertical blanking interval was originally needed because in a cathode ray tube monitor, the inductive inertia of the magnetic coils which deflect the electron beam vertically to the position being drawn could not change instantly and time needed to be allocated to account for the time necessary for the position change. Additionally, the speed of older circuits was limited. For horizontal deflection, there is also a pause between successive lines, to allow the beam to return from right to left, called the horizontal blanking interval. Modern CRT circuitry does not require such a long blanking interval, and thin panel displays require none, but the standards were established when the delay was needed and to allow the continued use of older equipment. In analog television systems the vertical blanking interval can be used for datacasting to carry digital data (e.g., various test signals, time codes, closed captioning, teletext, CGMS-A copy-protection indicators, various data encoded by the XDS protocol (e.g., content ratings for V-chip use), etc.), during this time period. The pause between sending video data is sometimes used in real time computer graphics to modify the frame buffer or to provide a time reference to allow switching the source buffer for video output without causing a visible tear in the displayed image.

To attain the low refresh rate, the TCON can update the active scanlines and then count to a maximum vertical blanking interval corresponding to the low refresh rate. Once the maximum vertical blanking interval times out, the TCON will re-drive the active scanlines (self-refresh), then count again to the maximum vertical blanking interval, and the process continues. This allows the display runs at low refresh rate.

The autonomous low refresh rate indication from the display engine to notify the TCON about frame activity can be either explicit or implicit. The explicit indication uses a signal called an autonomous low refresh rate signal to notify the TCON that there is no update from the display engine for a given frame time. The implicit indication leverages the frame data on the main link to notify the TCON that there is an update from the display engine. More specifically, for the explicit indication for the TCON to enter into the autonomous low refresh rate mode, the display engine can send the autonomous low refresh rate signal by using an external single wire, a secondary data packet over the eDP main link, as display port configuration data over an eDP aux link, or some other means.

The autonomous low refresh rate signal is sent by the display engine at the vertical blanking interrupt for the frame times with no updates, (e.g., no flip (frame update) pending at the vertical blanking interrupt). For the autonomous low refresh rate signal over an external cable, the display engine can send a pulse at the vertical blanking interval. For the autonomous low refresh rate signal using a secondary data packet over the main eDP link, the display engine can embed the autonomous low refresh rate message on the main link at the vertical blanking interrupt during the horizontal blanking interval (hblank) or vertical blanking interval (vblank). For the autonomous low refresh rate signal using display port configuration data (DPCD) over an eDP aux link, the display engine can embed the autonomous low refresh rate message into a DPCD register over an eDP aux link at the vertical blanking interrupt during the horizontal blanking interval or the vertical blanking interval.

The TCON uses the autonomous low refresh rate signal from the display engine to skip the self-refresh of the display backend. On receiving the autonomous low refresh rate signal, the TCON determines if the maximum vertical blanking interval has timed out or will timeout during the current frame time. The max vertical blanking corresponds to the vertical blanking interval for lowest refresh rate where the lowest refresh rate is achieved by running the active frame time at a pixel clock of the highest refresh rate and extending the vertical blanking interval by adding vertical blanking lines to the frame. The system can determine the minimum and maximum vertical blanking supported by the display by reading the VESA standard, Extended Display Identification Data (EDID) of the display. The monitor range limit descriptor of the EDID contains the display timing information. If the maximum vertical blanking interval has timed out or will timeout during the current frame time, then the TCON will perform self-refresh to the display backend. If the maximum vertical blanking interval has not timed out or will not timeout during the current frame time, the TCON will skip the self-refresh to the display backend until the maximum vertical blanking interval will timeout. Skipping the self-refresh to display backend will lower the display refresh rate, and lower the display power. In an illustrative example, for a display that supports a sixty (60) Hz refresh rate and a twenty (20) Hz refresh rate, the sixty (60) Hz refresh rate timing will be have active frame time of about 15.83 milliseconds (ninety-five percent (95%) times a $60^{th}$ (1/60) of a second) and a vertical blanking interval of about 0.83 milliseconds (five percent (5%) times a 60th (1/60) of a second), whereas the twenty (20) Hz refresh rate timing will have same active frame time of about 15.83 milliseconds (ninety-five percent (95%) times a $60^{th}$ (1/60) of a second) and maximum vertical blanking interval of about 34.17 milliseconds (1/20 minus (ninety-five percent (95%) times a 60th (1/60) of a second)).)

The autonomous low refresh rate signal can be used in PSR2 short loop to reduce the display refresh rate of semi-active workloads and lower the display power. However, the autonomous low refresh rate signal cannot be used in PSR2 deep sleep because the vertical blanking interrupt is not generated by the display engine in this state. Hence, in PSR2 deep sleep, the TCON can be notified of the deep sleep entry by the display engine, so that the TCON can skip the self-refresh to the display backend and operate at a low refresh rate.

For the implicit indication, the display engine can send an implicit indication to the TCON using the frame data on main link where the PSR2 selective updates are send at the start of the frame (SOF) rather than one scanline before or at the horizontal blanking lines of the dirty scanline. PSR2 selective updates are forced to be full frame such that full frames are always send when there is an update. The TCON is alerted that there is new image data for the current frame time at the start of a frame when receiving the image data and can determine that the display backend needs to be updated. On the other hand, if the TCON does not receive image data at the start of the frame, that is an indication that there is no frame update for the current frame time, so the self-refresh to display backend can be skipped. Similar to the explicit indication example, if the maximum vertical blanking interval has timed out or will time out in the current frame time, the TCON will perform the self-refresh for the display backend. If the maximum vertical blanking interval has not timed out or will not timeout in the current frame time, the TCON can skip the self-refresh of the display backend until the next maximum vertical blanking interval timeout. Again, skipping the self-refresh will reduce the display refresh rate, hence the display power. The implicit indication can be applied on both PSR2 Short Loop and PSR2 Deep Sleep to lower the display power by reducing the display refresh rate. The PSR2 selective update power savings (in order of 10's of mw) are insignificant compare to autonomous low refresh rate power savings (in order of 100's of mw), hence even after forcing a full frame update in PSR2 short loop there is still power savings.

The autonomous low refresh rate techniques can be extended to the dual display systems to independently lower the refresh rate on both the displays for semi active workloads. On dual display systems, the savings from autonomous low refresh rate will be two folds because of reduction in refresh rate of both the displays. In case of an explicit indication to enter the autonomous low refresh rate mode, two autonomous low refresh rate signals, one for each display, can be used.

In an example implementation, electronic devices 100a and 100b are meant to encompass an electronic device that includes a display with at least a first refresh rate or default refresh rate and a second refresh rate or low refresh rate, especially a computer, laptop, electronic notebook, hand held device, wearables, network elements that have a display, or any other device, component, element, or object that has an a display with at least a first refresh rate or default refresh rate and a second refresh rate or low refresh rate. Electronic devices 100a and 100b may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic devices 100a and 100b may include virtual elements.

Electronic devices 100a and 100b may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic devices 100a and 100b may include virtual elements.

In regards to the internal structure associated with electronic devices 100a and 100b, electronic devices 100a and 100b can include memory elements for storing information to be used in the operations outlined herein. Electronic devices 100a and 100b may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in electronic devices 100a and 100b could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of electronic devices 100a and 100b may include software modules (e.g., display engines 110a and 110b, TCONs 114a-114c, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic devices 100a and 100b may include one or more processors that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Figure 2:
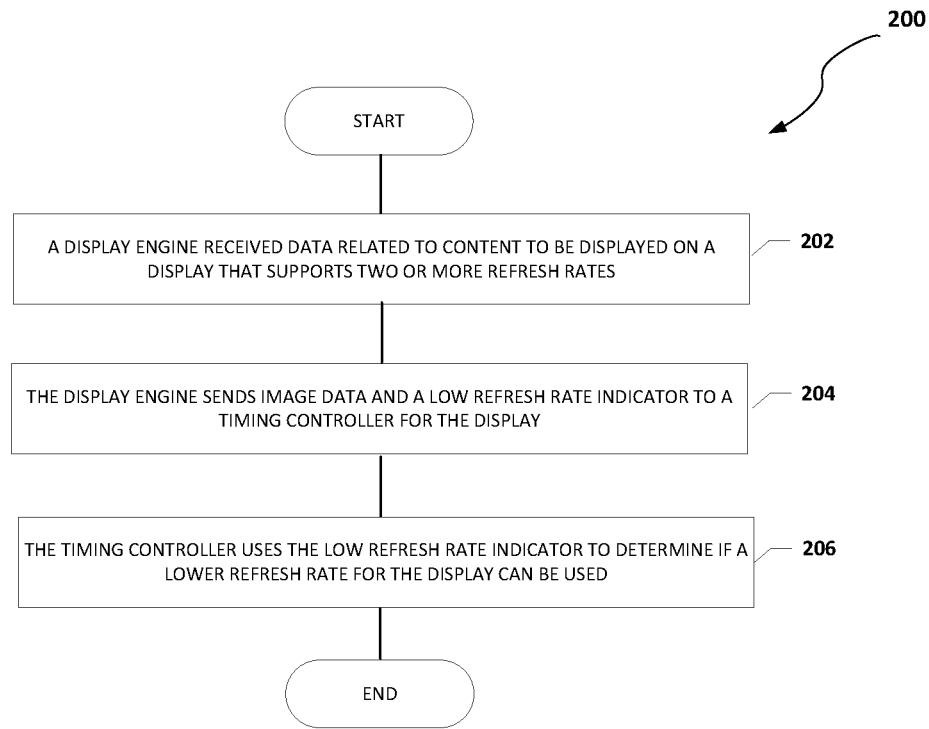
FIG. 2 is a simplified block diagram of a portion of a system to enable a low power refresh during a semi-active workload, in accordance with an embodiment of the present disclosure.

Turning to FIG. 2, FIG. 2 is an example flowchart illustrating possible operations of a flow 200 that may be associated with enabling a low power refresh during a semi-active workload, in accordance with an embodiment. In an embodiment, one or more operations of flow 200 may be performed by display engine 110a and TCON 114a, and display engine 110b and TCONs 114b and 114c. At 202, a display engine received data related to content to be displayed on a display that supports two or more refresh rates. At 204, the display engine sends image data and a low refresh rate indicator to a TCON for the display. For example, the low refresh rate indicator may be an explicit indicator or an implicit indicator. At 206, the TCON uses the low refresh rate indicator to determine if a lower refresh rate for the display can be used. For example, the TCON uses the low refresh rate indicator to determine if a lower refresh rate for the display can be used without further instructions or input from the display engine about whether or not the lower refresh rate can be used and in some examples, without the display engine changing the frame rate of the video stream.

Figure 3:
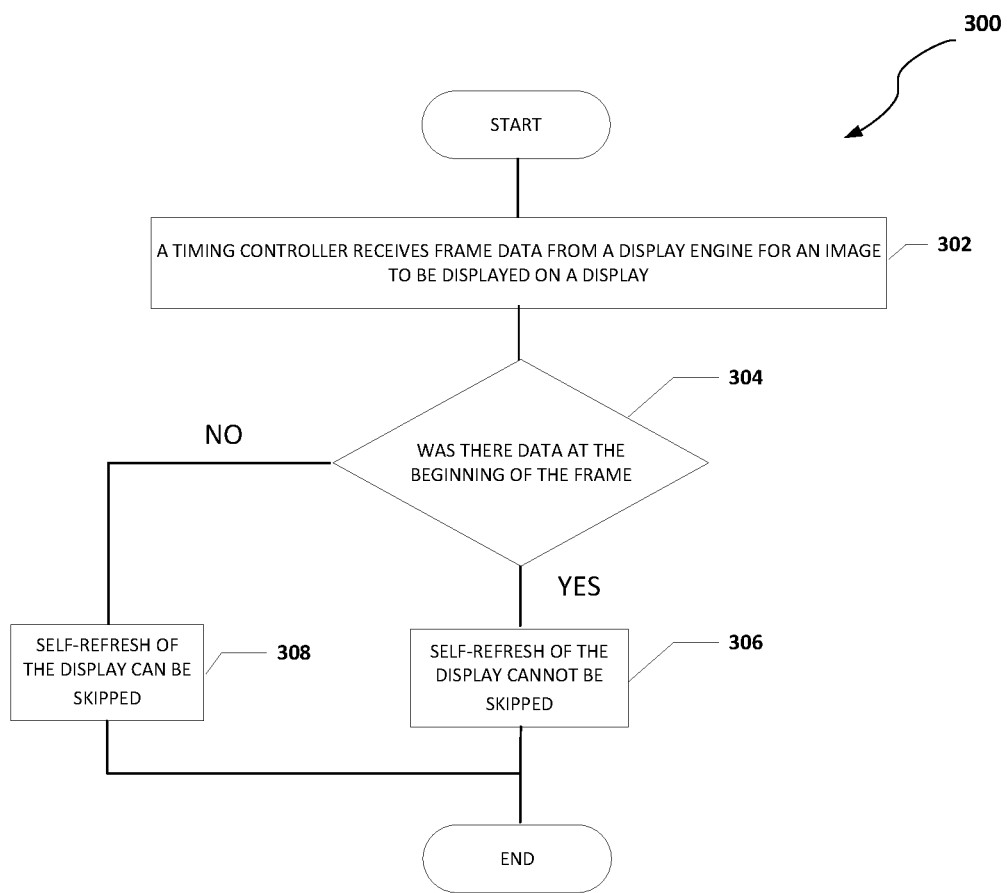
FIG. 3 is a simplified flowchart illustrating potential operations that may be associated with the system in accordance with an embodiment of the present disclosure.

Turning to FIG. 3, FIG. 3 is an example flowchart illustrating possible operations of a flow 300 that may be associated with enabling a low power refresh during a semi-active workload, in accordance with an embodiment. In an embodiment, one or more operations of flow 300 may be performed by display engine 110a and TCON 114a, and display engine 110b and TCONs 114b and 114c. At 302, a TCON receives frame data from a display engine for an image to be displayed on a display. At 304, the TCON determines if there was image data at the beginning of the frame. If there was image data at the beginning of the frame, then self-refresh for the display cannot be skipped, as in 306. If there was image data at the beginning of the frame, then self-refresh for the display can be skipped, as in 308.

Figure 4:
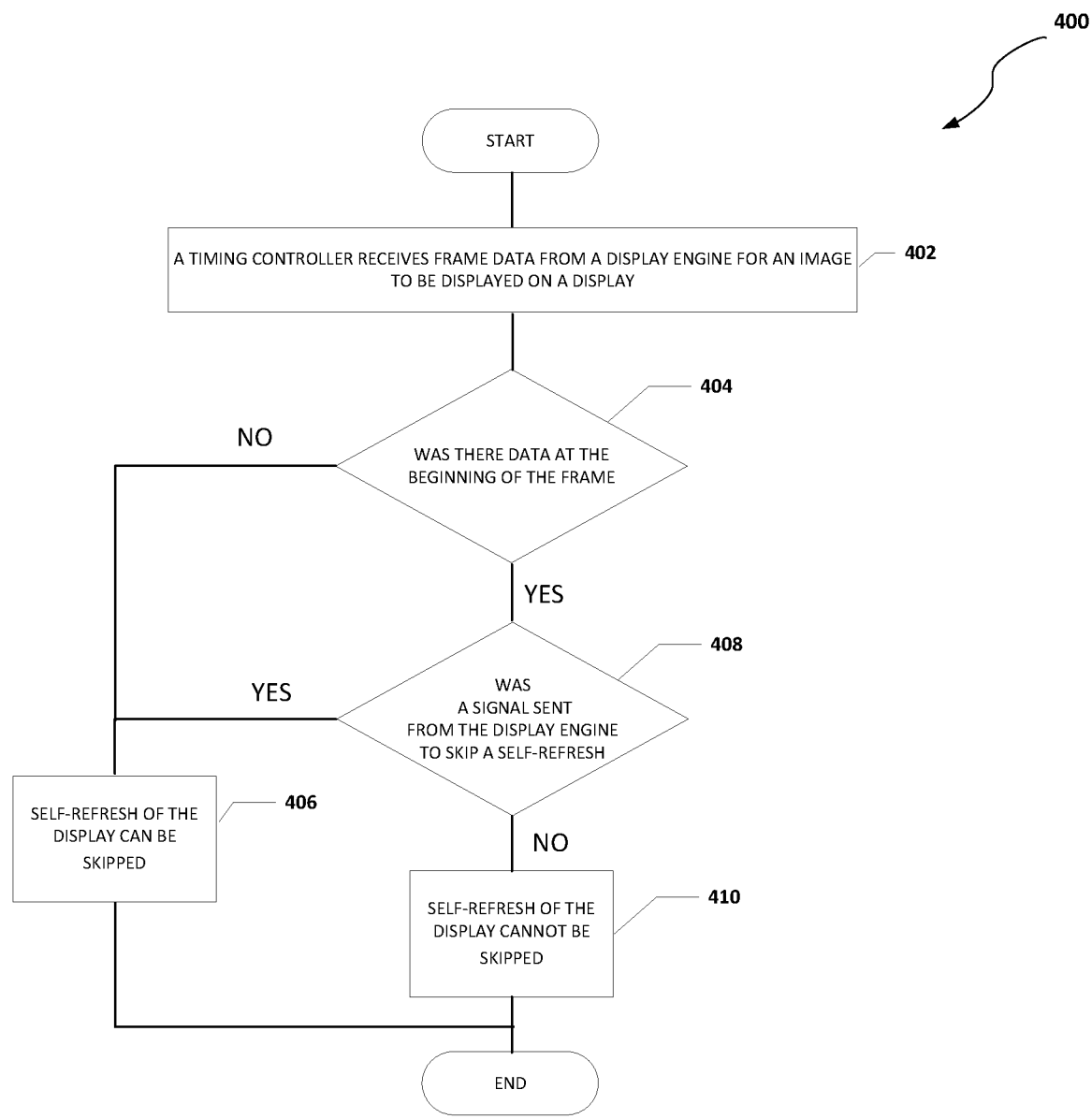
FIG. 4 is a simplified flowchart illustrating potential operations that may be associated with the system in accordance with an embodiment of the present disclosure.

Turning to FIG. 4, FIG. 4 is an example flowchart illustrating possible operations of a flow 400 that may be associated with enabling a low power refresh during a semi-active workload, in accordance with an embodiment. In an embodiment, one or more operations of flow 400 may be performed by display engine 110a and TCON 114a, and display engine 110b and TCONs 114b and 114c. At 402, a TCON receives frame data from a display engine for an image to be displayed on a display. At 404, the TCON determines if there was data at the beginning of the frame. If there was not data at the beginning of the frame, then self-refresh of the display can be skipped, as in 406. If there was data at the beginning of the frame, then the TCON determines if there was a signal from the display engine to skip the self-refresh, as in 408. If there was a signal from the display engine to skip the self-refresh, then self-refresh of the display can be skipped, as in 406. If there was a not a signal from the display engine to skip the self-refresh, then self-refresh for the display cannot be skipped, as in 410.

Figure 5:
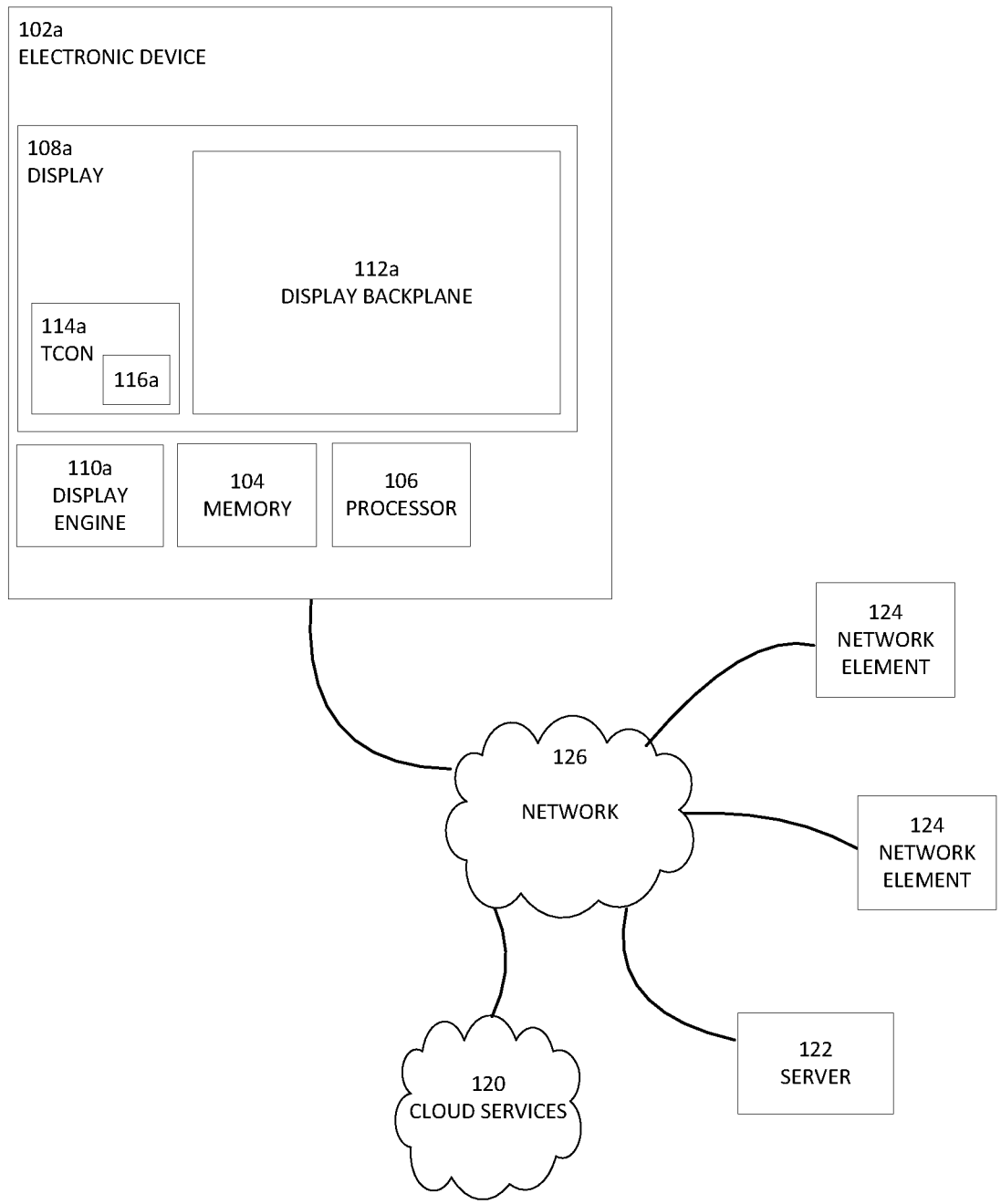
FIG. 5 is a simplified block diagram of an electronic device that includes a system to enable a low power refresh during a semi-active workload, in accordance with an embodiment of the present disclosure.

Turning to FIG. 5, FIG. 5 is a simplified block diagram of electronic device 102a configured to enable a low power refresh during a semi-active workload, in accordance with an embodiment of the present disclosure. In an example, electronic device 102a can include memory 104, one or more processors 106, display 108a, and display engine 110a. Display 108a can include display backplane 112a, and TCON 114a. In some examples, TCON 114a can include a remote frame buffer 116a.

Electronic device 102a (and electronic device 102b, not shown) may be a standalone device or in communication with cloud services 120, a server 122 and/or one or more network elements 124 using network 126. Network 126 represents a series of points or nodes of interconnected communication paths for receiving and transmitting packets of information. Network 126 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In network 126, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

It is also important to note that the operations in the preceding diagrams illustrates only some of the possible scenarios and patterns that may be executed by, or within, electronic devices 100a and 100b. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic devices 100a and 100b in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic devices 100a and 100b have been illustrated with reference to particular elements and operations, these elements and operations may be replaced by any suitable architecture, protocols, and/or processes that achieve the intended functionality of electronic devices 100a and 100b.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, an electronic device can include a display engine, where the display engine generates a video stream with a frame rate, a display, where the display includes an image viewable by a user and the image is refreshed at a first refresh rate, and a timing controller located in the display, where the timing control receives an indicator from the display engine and uses the indicator to determine that the first refresh rate can be lowered to a second refresh rate without the frame rate of the video stream from the display engine being changed.

In Example A2, the subject matter of Example A1 can optionally include where the display engine does not enter into a power saving mode.

In Example A3, the subject matter of any one of Examples A1-A2 can optionally include where the first refresh rate is sixty (60) hertz or more and the second refresh rate is a subharmonic of the first refresh rate.

In Example A4, the subject matter of any one of Examples A1-A3 can optionally include where the second refresh rate is twenty (20) hertz or less.

In Example A5, the subject matter of any one of Examples A1-A4 can optionally include where the indicator is a frame with no image data at a start of the frame.

In Example A6, the subject matter of any one of Examples A1-A5 can optionally include where the indicator is an express signal sent from the display engine.

In Example A7, the subject matter of any one of Examples A1-A6 can optionally include where the express signal is communicated over an external link, an embedded DisplayPort main link, or an embedded DisplayPort auxiliary link.

In Example A8, the subject matter of any one of Examples A1-A7 can optionally include a second display, where the display includes a second image viewable by the user and the second image is refreshed at a third refresh rate and a second timing controller, where the second timing controller receives a second indicator from the display engine and uses the second indicator to determine if the third refresh rate can be lowered to a fourth refresh rate without the frame rate of the video stream from the display engine being changed Example M1 is a method including receiving, at a timing controller located in a display, a video stream from a display engine at a frame rate, where the display includes an image viewable by a user and the image is refreshed at a first refresh rate, receiving an indicator from the display engine, and determining that the first refresh rate can be lowered to a second refresh rate without the frame rate of the video stream from the display engine being changed.

In Example M2, the subject matter of Example M1 can optionally include where the display engine does not enter into a power saving mode.

In Example M3, the subject matter of any one of the Examples M1-M2 can optionally include where the first refresh rate is sixty (60) hertz and the second refresh rate is a subharmonic of the first refresh rate.

In Example M4, the subject matter of any one of the Examples M1-M3 can optionally include where the second refresh rate is twenty (20) hertz.

In Example M5, the subject matter of any one of the Examples M1-M4 can optionally include where the indicator is a frame with no image data at a start of the frame.

In Example, M6, the subject matter of any one of the Examples M1-M5 can optionally include where the indicator is an express signal sent from the display engine.

In Example, M7, the subject matter of any one of the Examples M1-M6 can optionally include where receiving, at a second timing controller located in a second display, a second indicator from the display engine, where the second display includes a second image viewable by the user and the image is refreshed at a third refresh rate and determining that the third refresh rate can be lowered to a fourth refresh rate without the frame rate of the video stream from the display engine being changed.

Example S1 is a system for enabling a low power refresh during a semi-active workload. The system including a display engine, where the display engine generates a video stream with a frame rate, a display, where the display includes an image related to a semi-active workload that is viewable by a user and the image is refreshed at a first refresh rate, and a timing controller located in the display, where the timing control receives an indicator from the display engine and uses the indicator to determine that the first refresh rate can be lowered to a second refresh rate without the frame rate of the video stream from the display engine being changed.

In Example S2, the subject matter of Example S1 can optionally include where the display engine does not enter into a power saving mode.

In Example S3, the subject matter of any one of the Examples S1-52 can optionally include where the first refresh rate is sixty (60) hertz and the second refresh rate is a subharmonic of the first refresh rate.

In Example S4, the subject matter of any one of the Examples S1-53 can optionally include where the second refresh rate is twenty (20) hertz.

In Example S5, the subject matter of any one of the Examples S1-54 can optionally include where the indicator is a frame with no image data at a start of the frame.

Example AA1 is an apparatus including means for receiving, at a timing controller located in a display, a video stream from a display engine at a frame rate, where the display includes an image viewable by a user and the image is refreshed at a first refresh rate, means for receiving an indicator from the display engine, and means for determining that the first refresh rate can be lowered to a second refresh rate without the frame rate of the video stream from the display engine being changed.

In Example AA2, the subject matter of Example AA1 can optionally include where the display engine does not enter into a power saving mode.

In Example AA3, the subject matter of any one of Examples AA1-AA2 can optionally include where the first refresh rate is sixty (60) hertz and the second refresh rate is a subharmonic of the first refresh rate.

In Example AA4, the subject matter of any one of Examples AA1-AA3 can optionally include where the second refresh rate is twenty (20) hertz.

In Example AA5, the subject matter of any one of Examples AA1-AA4 can optionally include where the indicator is a frame with no image data at a start of the frame.

In Example AA6, the subject matter of any one of Examples AA1-AA5 can optionally include where the indicator is an express signal sent from the display engine.

In Example AA7, the subject matter of any one of Examples AA1-AA6 can optionally include where means for receiving, at a second timing controller located in a second display, a second indicator from the display engine, where the second display includes a second image viewable by the user and the image is refreshed at a third refresh rate and means for determining that the third refresh rate can be lowered to a fourth refresh rate without the frame rate of the video stream from the display engine being changed.

Example X1 is a machine-readable storage medium including machine-readable instructions to implement a method or realize an apparatus as in any one of the Examples A1-A7, M1-M7, or AA1-AA7. Example Y1 is an apparatus comprising means for performing any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:
a display engine, wherein the display engine generates a video stream with a frame rate;
a display, wherein the display includes an image viewable by a user and the image is refreshed at a first refresh rate, wherein the first refresh rate is a same rate as the frame rate; and
a timing controller located in the display, wherein based on a frame from the video stream not including new image data or changed image data, as compared to a previously received frame, the timing controller lowers the first refresh rate to a second refresh rate without the frame rate of the video stream from the display engine to the timing controller being changed, wherein the second refresh rate is lower than the frame rate of the video stream from the display engine to the timing controller.

2. The electronic device of claim 1, wherein the display engine does not enter into a power saving mode.

3. The electronic device of claim 1, wherein the first refresh rate is sixty (60) hertz or more and the second refresh rate is a subharmonic of the first refresh rate.

4. The electronic device of claim 1, wherein the second refresh rate is twenty (20) hertz or less.

5. The electronic device of claim 1, wherein the timing control receives an indicator from the display engine that the frame from the video stream does not include new image data or changed image data.

6. The electronic device of claim 5, wherein the indicator is a frame with no image data at a start of the frame or an express signal sent from the display engine.

7. The electronic device of claim 6, wherein the express signal is communicated over an external link, an embedded DisplayPort main link, or an embedded DisplayPort auxiliary link.

8. The electronic device of claim 7, further comprising:
a second display, wherein the display includes a second image viewable by the user and the second image is refreshed at a third refresh rate; and
a second timing controller, wherein the second timing controller receives a second indicator from the display engine and uses the second indicator to determine if the third refresh rate can be lowered to a fourth refresh rate without the frame rate of the video stream from the display engine being changed.

9. A method comprising:
receiving, at a timing controller located in a display, a video stream from a display engine at a frame rate, wherein the display includes an image viewable by a user and the image is refreshed at a first refresh rate, wherein the first refresh rate is a same rate as the frame rate;
receiving an indicator from the display engine that a frame from the video stream does not include new image data or changed image data, as compared to a previously received frame; and
determining that the first refresh rate can be lowered to a second refresh rate without the frame rate of the video stream from the display engine to the timing controller being changed, wherein the second refresh rate is lower than the frame rate of the video stream from the display engine to the timing controller.

10. The method of claim 9, wherein the display engine does not enter into a power saving mode.

11. The method of claim 9, wherein the first refresh rate is sixty (60) hertz and the second refresh rate is a subharmonic of the first refresh rate.

12. The method of claim 9, wherein the second refresh rate is twenty (20) hertz.

13. The method of claim 9, wherein the indicator is a frame with no image data at a start of the frame.

14. The method of claim 9, wherein the indicator is an express signal sent from the display engine.

15. The method of claim 9, further comprising:
receiving, at a second timing controller located in a second display, a second indicator from the display engine, wherein the second display includes a second image viewable by the user and the image is refreshed at a third refresh rate; and
determining that the third refresh rate can be lowered to a fourth refresh rate without the frame rate of the video stream from the display engine being changed.

16. A system for enabling a low power refresh during a semi-active workload, the system comprising:
a display engine, wherein the display engine generates a video stream with a frame rate;
a display, wherein the display includes an image related to a semi-active workload that is viewable by a user and the image is refreshed at a first refresh rate, wherein the first refresh rate is a same rate as the frame rate; and
a timing controller located in the display, wherein the timing control receives an indicator from the display engine that a frame from the video stream does not include new image data or changed image data, as compared to a previously received frame, and uses the indicator to determine that the first refresh rate can be lowered to a second refresh rate without the frame rate of the video stream from the display engine to the timing controller being changed, wherein the second refresh rate is lower than the frame rate of the video stream from the display engine to the timing controller.

17. The system of claim 16, wherein the display engine does not enter into a power saving mode.

18. The system of claim 16, wherein the first refresh rate is sixty (60) hertz and the second refresh rate is a subharmonic of the first refresh rate.

19. The system of claim 16, wherein the second refresh rate is twenty (20) hertz.

20. The system of claim 16, wherein the indicator is a frame with no image data at a start of the frame.

* * * * *

UNITED STATES PATENT AND TRADEMARK OFFICE
CERTIFICATE OF CORRECTION

| | |
|---|---|
| PATENT NO. | : 11,538,437 B2 |
| APPLICATION NO. | : 16/914325 |
| DATED | : December 27, 2022 |
| INVENTOR(S) | : Vishal R. Sinha et al. |

It is certified that error appears in the above-identified patent and that said Letters Patent is hereby corrected as shown below:

On the Title Page

In Item (57), under "ABSTRACT", Line 15, delete "indictor" and insert -- indicator --, therefor.

Signed and Sealed this
Fourth Day of April, 2023

Katherine Kelly Vidal
*Director of the United States Patent and Trademark Office*